United States Patent
Wagner (10) Patent No.: US 9,945,482 B2
(45) Date of Patent: Apr. 17, 2018

(54) LOW LOAD DUAL FLAP SEAL ASSEMBLY

(71) Applicant: John B. Wagner, Greenfield, IN (US)

(72) Inventor: John B. Wagner, Greenfield, IN (US)

(73) Assignee: Freudenberg-NOK General Partnership, Plymouth, MI (US)

( * ) Notice: Subject to any disclaimer, the term of this patent is extended or adjusted under 35 U.S.C. 154(b) by 76 days.

(21) Appl. No.: 14/147,027

(22) Filed: Jan. 3, 2014

(65) Prior Publication Data

US 2015/0192206 A1    Jul. 9, 2015

(51) Int. Cl.
*F16L 5/02*        (2006.01)
*F16J 15/02*       (2006.01)
*F16L 25/00*       (2006.01)
*F16L 33/02*       (2006.01)

(52) U.S. Cl.
CPC ........... *F16J 15/02* (2013.01); *F16L 25/0036* (2013.01); *F16L 33/02* (2013.01)

(58) Field of Classification Search
CPC .. F16J 15/02; F16J 15/104; F16J 15/10; F16L 25/0036; F16L 33/02; E21B 33/1208; Y10T 29/49
USPC .......................................................... 277/607
See application file for complete search history.

(56) References Cited

U.S. PATENT DOCUMENTS

| | | | | |
|---|---|---|---|---|
| 1,867,891 A | * | 7/1932 | Reynolds | 277/616 |
| 2,271,777 A | * | 2/1942 | Nathan | F16L 17/025 277/607 |
| 2,517,290 A | | 8/1950 | De Moude et al. | |
| 3,352,212 A | * | 11/1967 | Read | E21B 37/10 277/436 |
| 3,386,745 A | * | 6/1968 | Hein | F16L 17/025 277/605 |
| 3,414,273 A | * | 12/1968 | Sumner | F16L 17/025 277/607 |
| 3,578,027 A | * | 5/1971 | Zopfi | F16L 55/1141 138/89 |
| 4,189,807 A | * | 2/1980 | Byerly | F16L 3/1233 174/40 CC |
| 4,194,750 A | * | 3/1980 | Sovish | F16L 5/02 174/77 R |

(Continued)

FOREIGN PATENT DOCUMENTS

DE    2116684 A1    10/1972
EP    0015559 A1    9/1980
(Continued)

*Primary Examiner* — Nathan Cumar
(74) *Attorney, Agent, or Firm* — Daniel J. Sepanik, Esq.; Harness, Dickey & Pierce, P.L.C.

(57) ABSTRACT

A seal for sealing between a first member and a second member, including a first annular insert and a second annular insert axially spaced from the first annular insert. An elastomeric body includes a first portion over-molded on the first annular insert and a second portion over-molded on the second annular insert and an intermediate web extending between the first and second portions. The first and second portions including an annular flap extending from the first and second annular inserts that in an un-installed condition, extend radially relative to the first and second annular inserts and in an installed position are adapted to be compressed between the annular inserts and a surface of the first and second members.

17 Claims, 7 Drawing Sheets

(56) References Cited

U.S. PATENT DOCUMENTS

| | | | | |
|---|---|---|---|---|
| 4,213,619 | A | * | 7/1980 | Arlt ................ F16L 17/025 277/607 |
| 4,346,922 | A | * | 8/1982 | Ohtsuga ............ F16L 55/163 138/97 |
| 4,426,095 | A | * | 1/1984 | Buttner ............ F16L 17/025 277/606 |
| 4,771,675 | A | * | 9/1988 | Grauer .............. E21B 37/10 92/240 |
| 4,915,422 | A | * | 4/1990 | Chacon .............. B25B 27/10 277/615 |
| 5,038,829 | A | * | 8/1991 | Panella ............ F16L 55/115 138/89 |
| 5,096,233 | A | * | 3/1992 | Dlouhy ............ D06F 39/083 285/129.1 |
| 5,496,141 | A | * | 3/1996 | Popsys ............ B65D 39/0023 138/89 |
| 5,497,807 | A | * | 3/1996 | Rogers ............ F16L 55/1645 138/97 |
| 6,082,741 | A | * | 7/2000 | Gregoire ............ F16J 15/32 277/604 |
| 6,343,412 | B1 | * | 2/2002 | Stephenson .......... F16L 55/128 138/98 |
| 6,460,896 | B1 | * | 10/2002 | Stephens .............. E03F 3/04 285/136.1 |
| 6,769,721 | B2 | * | 8/2004 | Guest ................ F16L 33/18 285/239 |
| 7,798,497 | B2 | | 9/2010 | Wagner et al. |
| 8,083,237 | B2 | * | 12/2011 | Smith ................ F16J 15/104 277/616 |
| 8,480,093 | B2 | * | 7/2013 | Skinner ............ F16L 21/005 277/616 |
| 2005/0173869 | A1 | * | 8/2005 | Wagner ...................... 277/602 |
| 2008/0012234 | A1 | * | 1/2008 | Wagner ...................... 277/313 |
| 2008/0258406 | A1 | * | 10/2008 | Dahlheimer ................ 277/569 |
| 2011/0049815 | A1 | | 3/2011 | Wagner |
| 2013/0307228 | A1 | | 11/2013 | Wagner et al. |

FOREIGN PATENT DOCUMENTS

| | | |
|---|---|---|
| EP | 2557347 A2 | 2/2013 |
| GB | 2038976 A | 7/1980 |
| NL | 7006167 A | 11/1970 |

\* cited by examiner

LOW LOAD DUAL FLAP SEAL ASSEMBLY

FIELD

The present disclosure relates to seals and more particularly to a low load dual flap seal assembly.

BACKGROUND

This section provides background information related to the present disclosure which is not necessarily prior art.

Sealing applications typically require sealing between two members and sometimes require the ability to accommodate significant movement, misalignment or offset between the two members. Static offset sealing applications are used in engine, transmission and industrial applications. Conventional static seals sometimes use trapped rubber beads which produce too much force and are difficult to mold with undercuts and which produce significant radial force for assembly. Accordingly, it is desirable in the art to provide a seal arrangement that has the ability to accommodate perennial offset between two members and which requires a relatively low load for installation on the two members.

SUMMARY

This section provides a general summary of the disclosure, and is not a comprehensive disclosure of its full scope or all of its features.

According to one aspect of the present disclosure, a seal is provided for sealing between a first member and a second member and including a first annular insert and a second annular insert axially spaced from the first annular insert. An elastomeric body includes a first portion over-molded on the first annular insert and a second portion over-molded on the second annular insert and an intermediate web extending between the first and second portions. The first and second portions including an annular flap extending from the first and second annular inserts that in an un-installed condition, extend radially relative to the first and second annular inserts and in an installed position are adapted to be compressed between the annular inserts and a surface of the first and second members.

According to another aspect of the present disclosure, a helical coil insert includes a first end and a second end and an intermediate portion extending between the first and the second ends. The elastomeric body of the seal includes a first portion overmolded on the first end of the helical spring insert and a second portion overmolded on the second end of the helical spring insert. An intermediate web portion is overmolded on the intermediate portion of the helical spring insert and extends between the first portion and the second portion. The first portion and second portion each include an annular flap extending radially relative to the first and second ends of the helical spring insert and in an installed position is adapted to be compressed between the first end and second end of the helical spring insert and an annular surface of the first and second members.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 1:
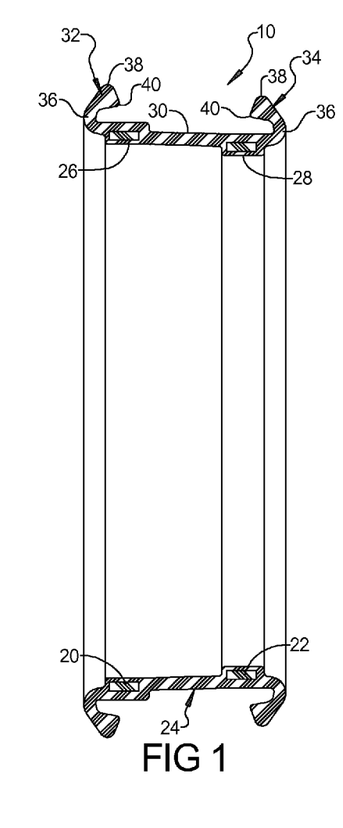
FIG. 1 is a cross-sectional view of a low load dual flap seal assembly for sealing between two bores of opposing members according to the principles of the present disclosure.
Figure 2:
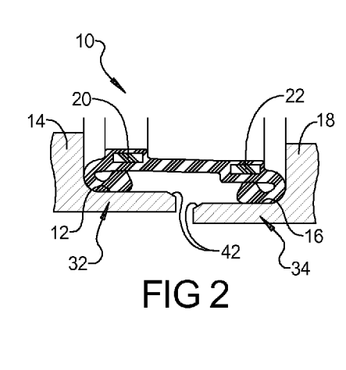
FIG. 2 is a cross-sectional view of the low load dual flap seal assembly of FIG. 1 shown installed within two bores of opposing members.

With reference to FIGS. 1 and 2, a low load dual flap seal assembly 10 according to the principles of the present disclosure will now be described. The seal assembly 10 is designed to be inserted in a sealing engagement between a first bore 12 of a first member 14 and a second bore 16 of a second member 18. By way of non-limiting example, the seal assembly 10 can be utilized for providing a sealed connection between a turbocharger 14 and mixer 16. However, it should be understood that the seal assembly 10 can be used in other applications for sealing between first and second members 14, 16.

As shown in FIG. 1, the seal assembly 10 includes a first annular insert 20 and a second annular insert 22. An elastomeric body 24 is provided with a first portion 26 over-molded on the first annular insert 20 and a second portion 28 over-molded on the second annular insert 22. An intermediate web portion 30 extends between the first portion 26 and second portion 28. A first annular flap 32 extends from the first portion 26 and a second annular flap 34 extends from the second portion 28. The first and second annular flaps can include a generally U-shaped body 36 and a terminal and portion 38 having a wider thickness than the U-shaped body 36. According to one aspect of the present disclosure, the terminal end portions 38 of the first and second annular flaps 32, 34 can include a raised bead region 40 on a radially inner surface of the annular flaps 32, 34. The terminal end portions 38 of the first and second annular flaps can be disposed radially outward of the first and second annular inserts 20, 22 due to the U-shaped body portion 36 of each of the annular flaps 32, 34. The first and second annular flaps 32, 34 are designed to be received within a respective bore 12, 16 in the first and second members 14, 18. First and second members 14, 18 can each include a chamfered end surface 42 that engages the outer surface of each of the annular flaps 32, 34. As the annular flaps 32, 34 are engaged with the chamfered and services 42 of the first and second members 14, 18, the annular flaps are folded over so that the raised bead portion 40 is compressed against the elastomeric material that is overmolded on the annular inserts 20, 22. The raised bead portions 40 are then compressed and dig into the elastomeric material overmolded on the annular inserts 20, 22. The annular flaps allow for relatively low insertion loads to be inserted into the bores, but provide great resistance against removal of the seal 10 from each of the bores 12, 16. In other words, the wedging effect that occurs upon attempted removal of the seal 10 on the bores 12, 16 behaves like a Chinese finger lock to prevent the removal of the seal 10 from the bores 12, 16.

Figure 3:
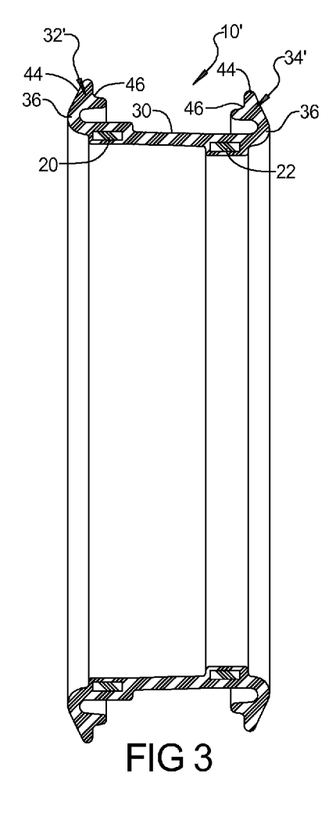
FIG. 3 is a cross-sectional view of a low load dual flap seal assembly having an alternative flap design for sealing between two bores of opposing members according to the principles of the present disclosure.

As shown in FIG. 1, the raised bead portions 40 at the ends of the annular flaps 32, 34 are generally triangular shaped. As an alternative, as illustrated in FIG. 3, the ends of the annular flaps 32', 34' can be V-shaped or otherwise shaped to provide differing insertion loads and retention loads. The V-shaped ends 44 of the annular flaps 32', 34' are provided with a notched out region 46. The depth of the notched out region 46 can be selected to increase or decrease the retention forces achieved by the seal 10'. Similarly, with respect to the width of the ends of the annular flaps 32, 34, it is noted that the width of the no flaps can be modified to increase or decrease the retention forces as well as the installation forces that are necessary to insert the seal 10 into the bores 12, 16.

Figure 4:
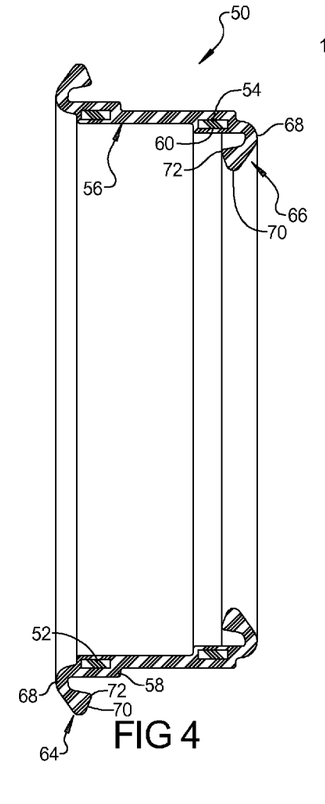
FIG. 4 is a cross-sectional view of a low load dual flap seal assembly for sealing between a bore and exterior surface of two opposing members according to the principles of the present disclosure.

With reference to FIG. 4, an alternative low load dual flap seal assembly 50 is shown. The seal assembly 50 includes a first annular insert 52 and a second annular insert 54. An elastomeric body 56 is provided with a first portion 58 over-molded on the first annular insert 52 and a second portion 60 over-molded on the second annular insert 54. An intermediate web portion 62 extends between the first portion 58 and second portion 60. A first radially outwardly extending annular flap 64 extends from the first portion 58 and a second radially inwardly extending annular flap 66 extends from the second portion 60. The first and second annular flaps 64, 66 can include a generally U-shaped body 68 and an end portion 70 having a wider thickness than the U-shaped body 68. According to one aspect of the present disclosure, the end portion 70 of the first annular flap 64 can include a raised bead region 72 on a radially inner surface of the first annular flap 64. The end portion 70 of the second annular flap 66 can include a raised bead region 72 on a radially outer surface of the second annular flap 66. The end portion 70 of the first annular flap 64 can be disposed radially outward of the first annular insert 52 due to the U-shaped body portion 68 of the first annular flap 64. The end portion 70 of the second annular flap 66 can be disposed radially outward of the second annular insert 54 due to the U-shaped body portion 68 of the second annular flap 66. The first annular flap 64 is designed to be received within a bore 12 in a first member 14. The second annular flap 66 is designed to be received on an exterior annular surface of a shaft or housing of a second member similar to the seal shown in FIGS. 7 and 8. The first and second members can each include a chamfered end surface 80 that engages the outer surface of each of the annular flaps 64, 66. As the annular flaps 64, 66 are engaged with the chamfered end surfaces 80 of the first and second members, the annular flaps are folded over so that the raised bead portion 72 is compressed against the elastomeric material that is over-molded on the annular inserts 52, 54. The raised bead portions 72 are then compressed and dig into the elastomeric material overmolded on the annular inserts 52, 54. The geometry of the annular flaps 64, 66 allow for relatively low installation loads, but provide great resistance against removal of the seal 50 from each of the opposing members. In other words, the wedging effect that occurs upon attempted removal of the seal 50 behaves like a Chinese finger lock to prevent the removal of the seal 50 from the first and second members.

The embodiment shown in FIGS. 1 and 2 illustrate an example of the annular flaps being both on the radially outer side of the seal 10, while the embodiment of FIG. 4 shows one annular flap 64 on the radially outer side and one annular flap 66 on the radially inner side of the seal 50. It is noted that it is also anticipated that the seal could be provided with both annular flaps on the radially inner side of the seal. The annular flaps can have the configuration as illustrated in FIG. 1 or alternative shapes of the annular flap such as that illustrated in FIG. 3.

Figure 5:
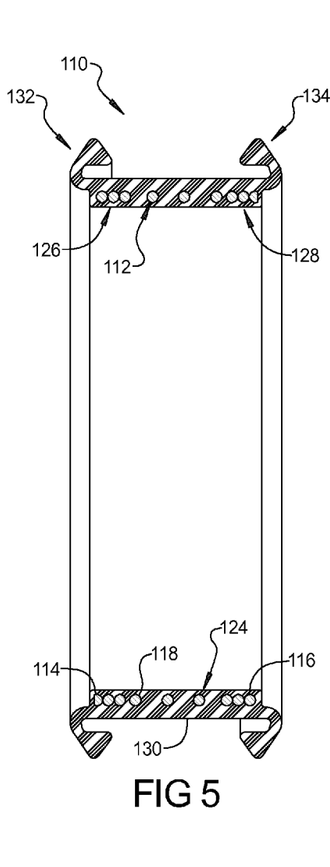
FIG. 5 is a cross-sectional view of a low load dual flap seal assembly having an over-molded helical coil spring for sealing between two bores of opposing members according to the principles of the present disclosure.
Figure 6:
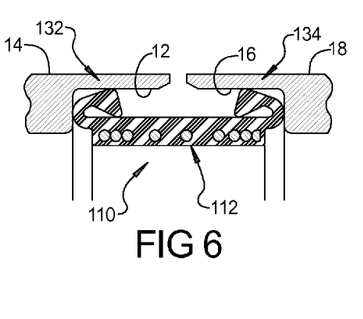
FIG. 6 is a cross-sectional view of a low load dual flap seal assembly having an over-molded helical coil spring for sealing between two bores of opposing members according to the principles of the present disclosure.

With reference to FIGS. 5 and 6, an alternative low load dual flap seal assembly 110 according to the principles of the present disclosure will now be described. The seal assembly 110 is designed to be inserted in a sealing engagement between a first bore 12 of a first member 14 and a second bore 16 of a second member 18.

As shown in FIG. 5, the seal assembly 110 includes a helical spring insert 112 having a first end 114 and a second end 116. An intermediate portion 118 extends between the first end 114 and the second end 116. The winding of the helical spring insert 112 can be tighter in the first and second ends 114, 116. An elastomeric body 124 is provided with a first portion 126 over-molded on the first end 114 of the helical spring insert 112 and a second portion 128 over-molded on the second end 116 of the helical spring insert 122. An intermediate web portion 130 extends between the first portion 126 and second portion 128 and is overmolded on the intermediate portion 118 of the helical spring insert 112. A first annular flap 132 extends from the first end portion 126 and a second annular flap 134 extends from the second end portion 128. The first and second annular flaps 132, 134 function in the same manner as the annular flaps 32, 34 as discussed above with reference to FIGS. 1 and 2. Therefore, a detailed description of the annular flaps 132, 134 has been omitted.

As shown in FIG. 5, the raised bead portions at the ends of the annular flaps 132, 134 are generally triangular shaped. As an alternative, as illustrated in FIG. 3, the ends of the annular flaps 32', 34' can be V-shaped or otherwise shaped to provide differing insertion loads and retention loads.

The first and second ends 114, 116 of the over-molded helical spring insert 112 functions in the same manner as the first and second annular inserts in the embodiment of FIGS. 1 and 2. In addition, the intermediate portion 118 of the helical spring insert 112 serve to reinforce the intermediate web portion of the seal 110 in order to prevent buckling therein.

Figure 7:
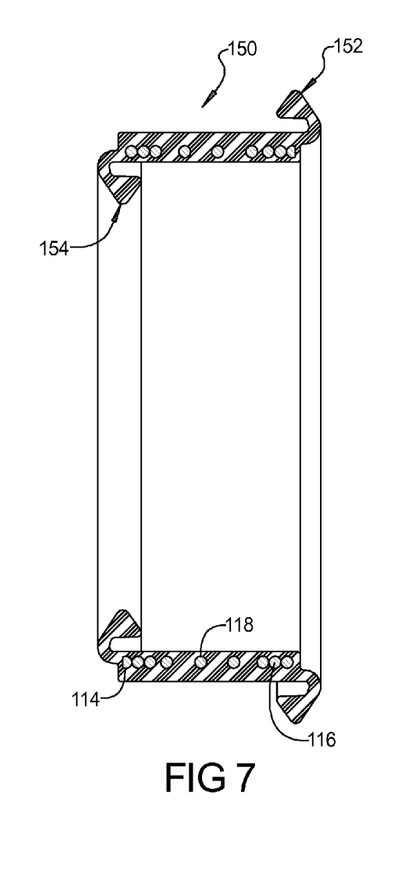
FIG. 7 is a cross-sectional view of a low load dual flap seal assembly having an over-molded helical coil spring for sealing between a bore and exterior surface of two opposing members according to the principles of the present disclosure.
Figure 8:
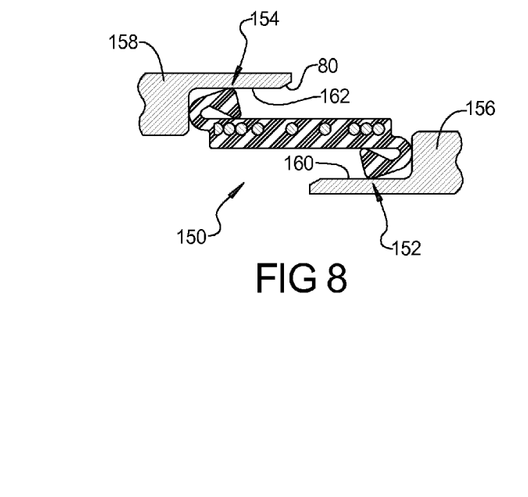
FIG. 8 is a cross-sectional view of the low load dual flap seal assembly of FIG. 7 shown installed between a bore and exterior surface of two opposing members.

With reference to FIGS. 7 and 8, an alternative low load dual flap seal assembly 150 is shown including a helical spring insert 112 in the same manner as the embodiment of FIGS. 5 and 6, as discussed above. In the embodiment of FIGS. 7 and 8, the seal assembly 150 includes one annular flap 152 on the radially outer side and one annular flap 154 on the radially inner side of the seal 50. It is noted that it is also anticipated that the seal could be provided with both annular flaps on the radially inner side of the seal. The annular flaps can have the configuration as illustrated in FIG. 1 or alternative shapes of the annular flap such as that illustrated in FIG. 3. FIG. 8 shows the seal assembly 150 installed between first and second members 156, 158 with the annular flap 152 received in a bore 160 in the first member 156 and the annular flap 154 received on an outer surface 162 of the second member 158. The first and second members 156, 158 are shown in a misaligned or offset position with the intermediate web portion 130 of the seal 150 flexing to accommodate for the offset.

Figure 9:
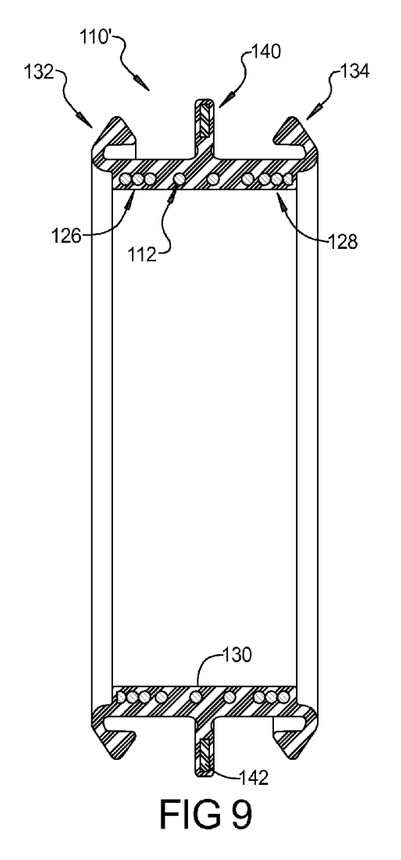
FIG. 9 is a cross-sectional view of a low load dual flap seal assembly having a center flange.
Figure 10:
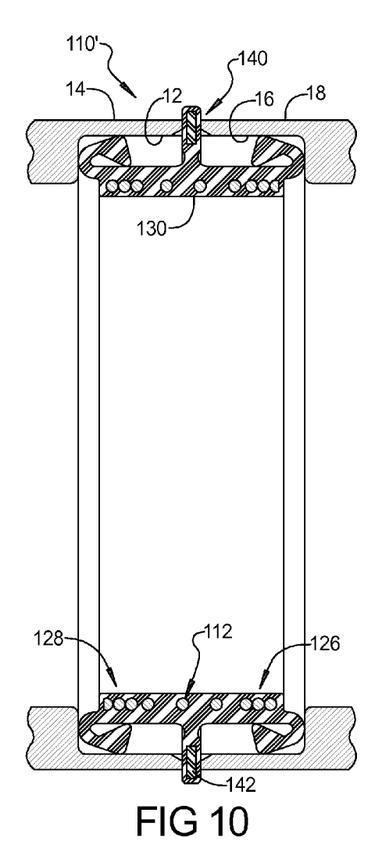
FIG. 10 is a cross-sectional view of the low load dual flap seal assembly having a center flange as shown in FIG. 9 for sealing between first and second members shown for illustrative purposes.

With reference to FIGS. 9 and 10, the low load dual flap seal assembly shown in FIGS. 5 and 6 has been modified to include a central flange 140 extending radially outward from the intermediate web portion 130. The central flange 140 can be reinforced with an annular insert 142 that can be generally disc-shaped with a central opening therein. The center flange 140 stabilizes the intermediate web portion at offset in order to keep the intermediate web portion 130 from buckling and also allows the use of through bores by providing a centering feature that prevents the seal assembly 110' from being inserted too far into the bores 12, 16 of either of the first or second members 14, 18, thereby keeping the seal assembly 110' properly centered. The center flange 140 also stiffens the intermediate web portion 130 when the seal assembly 110' is pressurized and gives the two end portions 126, 128 added support for assembly. Although the center flange 140 is shown with the embedded helical coil spring embodiment of FIGS. 5 and 6, it should be understood that the center flange concept can be utilized with each of the alternative embodiments disclosed herein.

Figure 11:
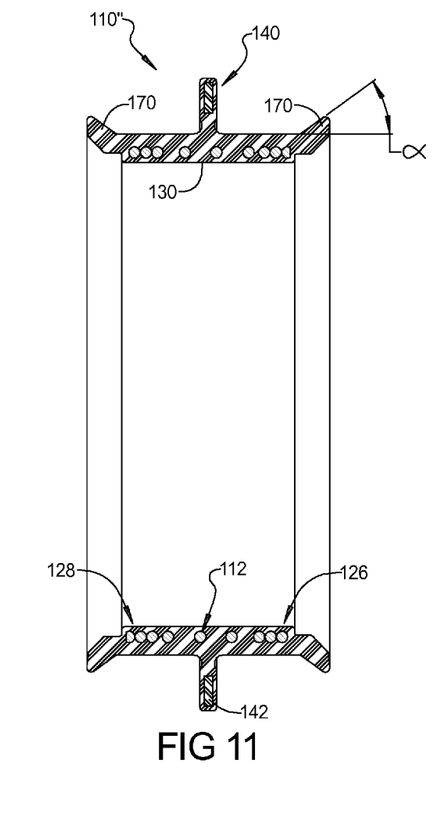
FIG. 11 is a cross-sectional view of a low load dual flap seal assembly having a center flange and alternative and flap design.
Figure 12:
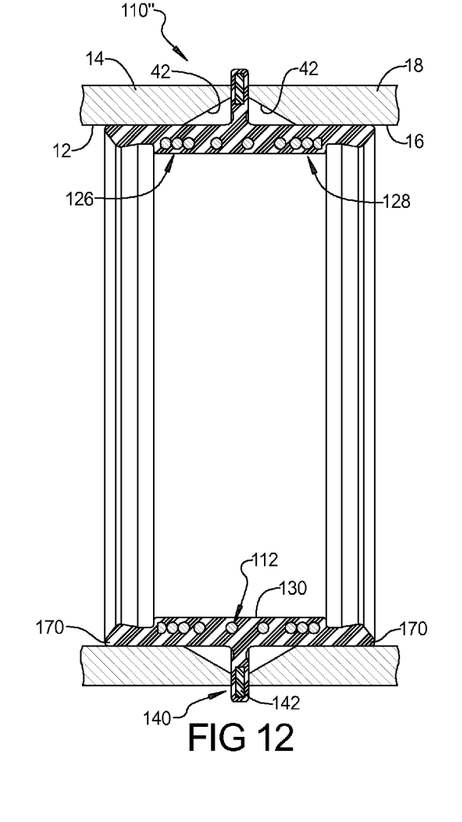
FIG. 12 is a cross-sectional view of the low load dual flap seal assembly having a center flange as shown in FIG. 11 for sealing between first and second members shown for illustrative purposes.

With reference to FIGS. 11 and 12, a further alternative embodiment of the dual flap seal assembly 110'' is shown including a center flange 140 extending from the web portion 130 in the same manner as the embodiment of FIGS. 11 and 12. In the embodiment of FIGS. 11 and 12, the end flaps have been modified to provide a non-overlapping configuration. In particular, each of the angled end flaps 170 extend axially from the end portions 126, 128 and are angled radially outwardly to provide an interference with the surface of the bores 12, 16 of the first member 14 and second member 18, respectively. Therefore, upon insertion of the angled end flaps 170 into the bores 12, 16, the angled flaps 170 are deformed radially inward and due to their deformation are self biased into a sealing engagement with the inner surface of the bores 12, 16. Although the angled flaps 170 are shown with the embedded helical spring 112, the angled flaps 170 could be used with alternative seal assemblies having the inserts 20, 22 or with other insert designs or without inserts. The angled flaps 170 can extend outwardly at an angle α of between 15 and 45 degrees and more preferably approximately 30 degrees relative to a direction parallel to a center axis of the seal 110''. Like with the prior embodiments, the first and second members 14, 18 can be provided with a beveled end surface 42 that are angled such that as they engage the angled flaps 170 the angled flaps are bent inward to an increasing degree until they are fully received within the bores 12, 16 past the beveled end surfaces 42. The beveled end surfaces 42 can be angled between 15 and 45° and more preferably approximately 30° relative to a direction parallel to a center axis of the bores. The use of an oil or other lubricant would help to facilitate the sliding engagement of the angled flaps 170 along the beveled and surfaces 42 during assembly of the seal.

Figure 13:
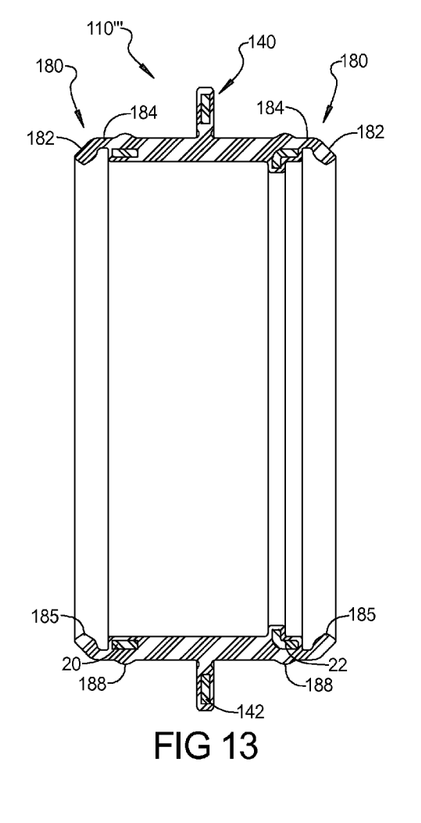
FIG. 13 is a cross-sectional view of a low load dual flap seal assembly having a center flange and alternative and flap design.
Figure 14:
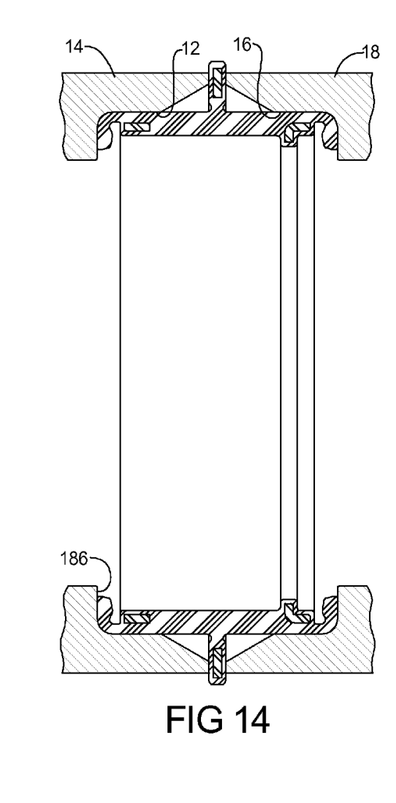
FIG. 14 is a cross-sectional view of the low load dual flap seal assembly having a center flange as shown in FIG. 13 for sealing between first and second members shown for illustrative purposes.
Figure 15:
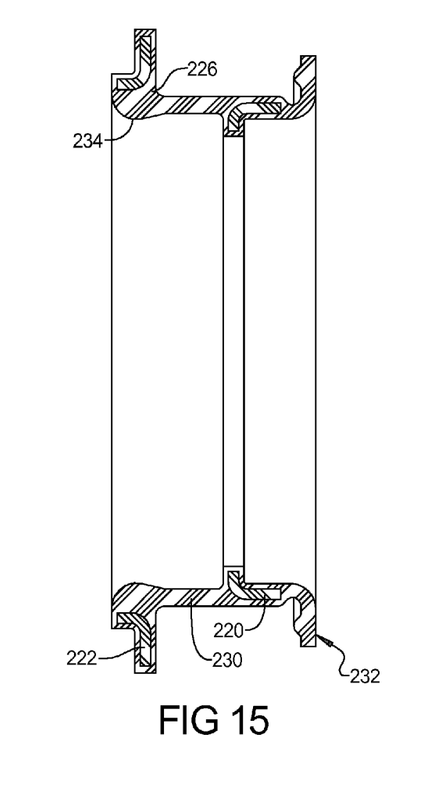
FIG. 15 is a cross-sectional view of a low load flap seal assembly for sealing between a bore and exterior surface of two opposing members according to the principles of the present disclosure.
Figure 16:
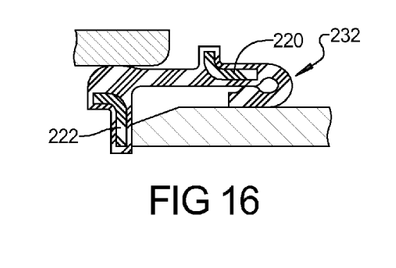
FIG. 16 is a cross-sectional view of the low load flap seal assembly of FIG. 15 shown installed between a bore and exterior surface of two opposing members.

With reference to FIGS. 13 and 14, a further alternative embodiment of the dual flap seal assembly 110''' is shown including a center flange 140 extending from the web portion 30 in the same manner as the embodiment of FIGS. 9-12. In the embodiment of FIGS. 13 and 14, the end flaps 180 have been modified to provide an alternative configuration. In particular, each of the end flaps 180 extend at an angle generally radially inwardly from the end portions 26, 28 and include an axially extending flap portion 182 with a hinge section 184 so that the flap portion 182 is designed to engage a shoulder 186 within the bores 12, 16 of each of the first and second members 14, 18. Upon engagement of the shoulders 186, the axially extending flap portion 182 is deformed radially inward about the hinge 184. The axially extending flap portions 182 are then self biased due to their deformation into a sealing engagement with the shoulder portions 186 of the first member 14 and second member 18, respectively. Therefore, upon insertion of the end flaps 180 into the bores 12, 16, the flaps 182 are deformed radially inward about the hinge section 184 and due to their deformation are self biased into a sealing engagement with the shoulder surface 186 of the bore. The flaps 182 include raised bead portions 185 that can be compressed against the end portions 26, 28 to further apply a spring load on the flaps 182. In the embodiment of FIGS. 15 and 16, the first and second inserts 20, 22 can be formed cylindrical with a elongated straight cross-section, or can have an L-shaped or other cross-section. An L-shaped cross-section can provide the insert with additional hoop strength to resist against deformation. A raised seal bead 188 can be provided on an exterior surface of the seal radially outward of the inserts 20, 22 for engagement on an interior surface of the bores 12,16 of the first and second members 14, 18 in order to provide additional sealing engagement therewith.

With reference to FIGS. 15 and 16, an alternative low load flap seal assembly 210 is shown including a first annular insert 220 and a second annular insert 222. An elastomeric body 224 is provided with a first portion 226 over-molded on the first annular insert 220 and a second portion 228 over-molded on the second annular insert 222. An intermediate web portion 230 extends between the first portion 226 and second portion 228. A annular flap 232 extends from the first portion 226. The annular flap 232 is formed in the same manner as the annular flap 32 as shown in the embodiment of FIGS. 1 and 2, or can be formed in the manner as the annular flap 32' as shown in FIG. 3. The second portion 228 of the elastomeric body can be provided with a protruding rib portion 234 for engaging a second member. Therefore, in the embodiment of FIGS. 9 and 10, the seal assembly 210 is provided with an annular flap 232 only at one end. It should be understood that the annular flap 232 could extend radially outward to overlap annular insert 220 on the outer surface for receipt in a bore as illustrated, or alternatively, the annular flap 232 could extend radially inward to overlap the annular insert on the inner surface for receipt on a shaft or exterior surface of the first member.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A seal for sealing between a first bore in a first member and a second bore in an opposing second member, comprising:
   a first annular insert;
   a second annular insert axially spaced from said first annular insert; and
   an elastomeric body including a first portion over-molded on said first annular insert and a second portion over-molded on said second annular insert and an intermediate web extending between the first and second portions, said first portion including a first annular flap on an exterior side of said first annular insert that in an un-installed condition, extends radially outward relative to said first annular insert and in an installed position is adapted to be compressed between said first annular insert and an inner surface of the first bore, said second portion including a second annular flap on an exterior side of said second annular insert that in an un-installed condition, extends radially outward relative to said second annular insert and in an installed position is adapted to be compressed between said second annular insert and an inner surface of the second bore, wherein said first and second annular flaps each include a proximal end connected to said elastomeric body over-molded to said first and second annular inserts respectively and a generally U-shaped body terminating at a distal end having a wider thickness than a thickness of said U-shaped body, the distal end of the first and second annular flaps being spaced from the elastomeric body over-molded to said first and second annular inserts in the unassembled condition.

2. The seal according to claim 1, wherein said distal end of said first annular flap includes a smooth transition region from said U-shaped body on a radially outer surface of said first annular flap and a raised bead region on a radially inner surface of said first annular flap.

3. The seal according to claim 2, wherein said distal end of said first annular flap includes a triangular cross-section.

4. The seal according to claim 2, wherein in the installed position, said raised bead region is compressed against the elastomeric body over-molded to said first annular insert.

5. The seal according to claim 2, wherein said distal end of said first annular flap includes a V-shaped cross-section.

6. A seal for sealing between a first member and a second member, comprising:
   a first annular insert;
   a second annular insert axially spaced from said first annular insert; and
   an elastomeric body including a first portion over-molded on said first annular insert and a second portion over-molded on said second annular insert and an intermediate web extending between the first and second portions, said first portion including a first annular flap extending from said first annular insert that in an un-installed condition, extends radially relative to said first annular insert and in an installed position is adapted to be compressed between said first annular insert and a surface of the first member, said second portion including a second annular flap extending from said second annular insert that in an un-installed condition, extends radially relative to said second annular insert and in an installed position is adapted to be compressed between said second annular insert and a surface of the second member, wherein said first and second annular flaps each include a proximal end connected to said elastomeric body over-molded to said first and second annular inserts respectively and a generally U-shaped body terminating at a distal end having a wider thickness than a thickness of said U-shaped body, the distal end of the first and second annular flaps being spaced from the elastomeric body over-molded to said first and second annular inserts in the unassembled condition.

7. The seal according to claim 6, wherein said distal end of said first annular flap includes a raised bead region on a surface of said first annular flap that opposes said elastomeric body over-molded to said first annular insert.

8. The seal according to claim 7, wherein said distal end of said first annular flap includes a triangular cross-section.

9. The seal according to claim 7, wherein in the installed position, said raised bead region is compressed against the elastomeric body over-molded to said first annular insert.

10. The seal according to claim 7, wherein said distal end of said first annular flap includes a V-shaped cross-section.

11. The seal according to claim 6, further comprising a center flange extending radially from said intermediate web portion.

12. The seal according to claim 11, wherein said center flange includes an annular insert overmolded by said elastomeric body.

13. A seal for sealing between a first member and a second member, comprising:
   a first annular insert;
   a second annular insert axially spaced from said first annular insert; and
   an elastomeric body including a first portion over-molded on said first annular insert and a second portion over-molded on said second annular insert and an intermediate web extending between the first and second portions, said first portion including a first annular flap extending from the first portion over-molded on said first annular insert that in an un-installed condition, extends radially relative to said first annular insert and in an installed position between the first member and the second member is adapted to be deformed by a surface of the first member, said second portion including a second annular flap extending from the second portion over-molded on said second annular insert that in an un-installed condition, extends radially relative to said second annular insert and in an installed position between the first member and the second member is adapted to be deformed by a surface of the second member, wherein said first and second annular flaps each include a proximal end connected to said elastomeric body over-molded to said first and second annular inserts respectively and a generally U-shaped body terminating at a distal end having a wider thickness than a thickness of said U-shaped body, the distal end of the first and second annular flaps being spaced from the elastomeric body over-molded to said first and second annular inserts in the unassembled condition.

14. The seal according to claim 13, further comprising a center flange extending radially from said intermediate web portion.

15. The seal according to claim 14, wherein said center flange includes an annular insert overmolded by said elastomeric body.

16. The seal according to claim 13, wherein in an uninstalled condition, said first annular flap extends radially outwardly at an angle relative to a direction parallel to a center axis of the seal.

17. The seal according to claim 13, wherein in an uninstalled condition, said first annular flap extends radially inwardly at an angle relative to a direction parallel to a center axis of the seal.

* * * * *